3,057,896
HYPERBASIC SULFONATES
Raymond C. Schlicht, Hopewell Junction, and Herman D. Kluge, Fishkill, N.Y., assignors to Texaco Inc., a corporation of Delaware
No Drawing. Filed Dec. 6, 1957, Ser. No. 700,989
19 Claims. (Cl. 260—435)

The instant invention relates to a process for preparing hyperbasic metal sulfonates, and to hyberbasic metal sulfonates therefrom containing an exceedingly high proportion of dispersed basic metals such as calcium.

By a hyperbasic sulfonate we mean one wherein no promoter such as alkyl phenol, an amine, or a low molecular weight acid or the like is used, yet the ratio of filterably dispersed and/or combined metal equivalents to sulfonic acid equivalents in the resulting product is substantially above that present in the corresponding normal metal sulfonate. A normal sulfonate formula of a monosulfonic acid salt can be written $(RSO_3)_2Me$ where $RSO_3$ stands for the sulfonate radical and Me for an alkaline earth metal. As the number of hydrogen equivalents of alkaline earth metal and of sulfonic acid filterably dispersed are each two in said normal sulfonate, the metal ratio is one. Products from our process have much higher metal ratios, often ranging to as high as about 9 filterably dispersed therein. By the term "metal ratio" we mean, then, the ratio of equivalents of metal to equivalents of sulfonic acid present in a particular mixture, e.g., in filterable dispersion in the case of our hyperbasic product on the one hand, and in simple overall bulk (free and combined) relationship in a reaction mixture formulated for converting into our hyperbasic product on the other hand.

Our process is simple and economical, and it provides a way of incorporating very high metal content in filterable dispersion (particularly calcium and magnesium which are ordinarily difficult to make in high metal ratio). More particularly, our process uses no promoter to accomplish this desirable result, and, in the preferred class of our hyperbasic sulfonate, all the organic anionic radicals present in the product are radicals of oil-soluble sulfonic acids having molecular weights of at least about 350.

Broadly our process comprises forming a reaction mixture of at least one inert, stable, oxygenated vehicle selected from the group consisting of lower alkanols, water, and lower alkoxy ethanols, at least one sulfonic compound selected from the group consisting of oil-soluble sulfonic acids and normal metal salts thereof, a sufficient amount of at least one basic metal compound selected from the group consisting of metal oxides, hydroxides, and hydrated oxides for establishing a metal ratio in the said reaction mixture in excess of 1, at a temperature below the atmospheric boiling point of said oxygenated vehicle and generally below about 190° F., injecting into and dispersing through said reaction mixture at least about a mol of an acidic gas selected from the group consisting of $H_2S$, $CO_2$, and $SO_2$ and mixtures of same per equivalent of basic metal compound and subsequently stripping off said vehicle and incidental water from the reaction mixture in the presence of additional of said acidic gas whereby a filterable hyperbasic metal sulfonate results.

Selection of the vehicle for our process is very important. The preferable vehicle is a lower alkanol, that is, $C_1$—$C_3$ alkanol, most preferredly methanol for its economy, ease of recovery, and outstanding effectiveness in producing bright, stable products of very high metal ratio. Oddly, we have found the lower aliphatic ketone, acetone, ineffective for our purpose. Water and the lower alkoxy ethanols, i.e., 2-ethoxy ethanol-1 ("Cellosolve"), 2-methoxy-ethanol-1 ("Methylcellosolve"), 2-propoxy ethanol-1, and 2-butoxy ethanol-1 ("Butylcellosolve") are also very good vehicles for our process and have low enough boiling points for easy and substantially complete removal from the reaction mixture by stripping without use of reduced pressure.

Typical oil-soluble sulfonic acids for use in our process include petroleum sulfonic acids such as the mahogany sulfonic acids, alkylated aromatic sulfonic acids, petrolatum sulfonic acids, paraffin wax sulfonic acids, petroleum naphthene sulfonic acids, polyisobutylene sulfonic acids, mono- and poly-wax or other alkyl substituted benzene sulfonic acids, mono- and poly-wax or other alkyl substituted naphthalene sulfonic acids, mono- and poly-wax or other alkyl substituted cyclohexyl sulfonic acids, and mixtures of the foregoing. Preferably, the sulfonic acid used in our process will have been derived from sulfonation of a petroleum fraction or a synthetic hydrocarbon; it will be a monosulfonic acid having a molecular weight between about 450 and 550, but the molecular weight of the sulfonic acid can be as low as 350 for making sufficiently oil-soluble normal sulfonates or as high as 1500. By oil-soluble we mean soluble in a conventional mineral lubricating oil fraction to the extent of at least about 5 weight percent.

In the ordinary instance the sulfonic acid useful in our process is supplied from sulfonation of petroleum or synthetic hydrocarbon oil stocks, and is diluted by an oily, water-immiscible, organic medium (which for most cases will be a petroleum hydrocarbon or synthetic hydrocarbon fraction such as a lubricating oil fraction, a gas-oil fraction, or an even lighter cut such as benzene, or a light solvent naphtha). Alternatively, the oily diluent organic medium can be a synthetic lubricant or diluent such as polyoxyalkylene glycol of mol weight between about 200 and 4000, a polymerized olefin, trioctyl phosphate, polymeric tetrahydrofuran, and polyalkyl silicone polymers in the mol weight range of 200 to 2000. The water-immiscible medium will have solubility in water of less than about 5 weight percent at room temperature; the concentration of the sulfonic acid (and/or normal alkaline earth metal sulfonate if that is used as a sulfonic charge material in our process) will be broadly between about 10 and 100 weight percent and more generally between 30 and 70 percent. While a sulfonic acid is the preferable sulfonic charge material for our process because of its efficiency and economy, it is also possible to use one or more normal metal (e.g., barium, strontium, calcium, lead, lithium, and/or magnesium) sulfonates corresponding to such sulfonic acid, or a mixture of the normal sulfonate and the corresponding sulfonic acid or mixed sulfonic acids. In fact, in some instances, the use of the normal sulfonate salt is advantageous over the acid because it can stand more severe handling conditions and is often available in higher concentration.

The normal sulfonate can be made in a number of ways. One way is to employ a double decomposition reaction between an aqueous alkaline earth metal salt solution, e.g., an alkaline earth metal chloride, and the sodium salt of an oil-soluble sulfonic acid. Another way is to neutralize an oil-soluble sulfonic acid with a metal hydroxide and/or oxide or hydrated oxide. This type of of neutralization is, in fact, what appears to occur in the preferred operation of our process when the metal oxide, hydroxide and/or hydrated oxide is mixed with the sulfonic acid (or mixed sulfonic acids) in the formation of the reaction mixture for subsequent processing. In any case, the sulfonic acid and/or normal sulfonate supplied to the process is best dehydrated, to guard against haze formation in the end product, e.g., by heating, optionally with a stripping gas such as nitrogen, or by use of azeotropic distillation, prior to admixture with the inert oxygenated vehicles other than water. While all the reaction vehicles useful in our process can be used in admixture with one another, we have found that the brightest and most stable products (free from any haze after prolonged storage periods) can be made by starting out with substantially anhydrous sulfonic acid and/or normal sulfonate charge stocks.

Advantageously, 2–10 and preferably 3–6 parts by weight of oxygenated vehicle per part of basic metal compound (oxide, hydroxide, or hydrated oxide) are used in our process. Use of more vehicle compounds the recovery problems and cuts down on reactor space available for final product. Use of lower proportions of vehicle tends to give products of lower metal ratio than are obtainable when the prescribed proportions of vehicle are used. The basic metal compounds advantageous in our process are the oxides, hydroxides, and/or hydrated oxides, e.g., magnesia, magnesium hydroxide, quicklime, slaked lime, barium hydroxide, barium oxide, strontium hydroxide, lithium hydroxide monohydrate, and litharge.

Many other basic metal compounds are available, of course, for practice of our process; the foregoing list is illustrative rather than restrictive. Actually, while basic metal compound is usually and advantageously selected from groups I, II, and IV of the periodic table for use in preparing sulfonate motor lubricating oil detergent additives (and even more advantageously selected from the group consisting of lithium, barium, strontium, calcium, magnesium, zinc, cadmium, and lead), the other metals such as tin, aluminum, chromium, antimony, arsenic, iron, cobalt, nickel, copper, manganese, and, in fact, a wide variety of polyvalent basic metal compounds, (i.e., oxides, hydroxides, or hydrated oxides) which are capable of making a normal sulfonate "soaps" by conventional neutralization of the sulfonic acid are also suitable for use in our process for making into a hyperbasic metal sulfonate with various metal ratios above one. However, we have found that the greatest metal ratios in our hyperbasic sulfonates can be made by using basic alkaline earth metal compounds, especially calcium compounds. Also, because alkaline earth metal sulfonates are currently the most popular type of sulfonate detergent used in motor lubricating oils, our efforts have been directed particularly to making hyperbasic alkaline earth metal sulfonates. Various other uses will be apparent for the hyperbasic sulfonates of these and other metals, e.g., use as bearers of the metal in non-aqueous mixtures, catalysts, tanning assistants, etc.

In making hyperbasic calcium sulfonates of our invention we prefer to use the commercial grade of calcium hydroxide known as "grease lime." The typical analysis of it is as follows:

| | Percent |
|---|---|
| Total calcium (calculated as $Ca(OH)_2$) | 98.0 |
| Carbon dioxide | 1.2 |
| Silica | 0.4 |

We have found that we can secure as high a metal ratio in our product with this particular lime as with C.P. calcium oxide. For convenience we prefer to use magnesia (MgO) in the preparation of the hyperbasic magnesium sulfonates rather than $Mg(OH)_2$ or the hydrated oxide, and we find BaO more economical to use than $Ba(OH)_2$.

In order to obtain a high metal ratio in the hyperbasic product, the proportion of basic metal compound used in forming the reaction mixture should be in excess of one equivalent per equivalent of sulfonic acid present in the reaction mixture (i.e., the metal ratio established in the initial mixture should be in excess of 2) and can go as high as 20 or even higher. Preferably, however, for ease in filtration of the finished goods wherein unreacted and insoluble basic metal compound, derivatives thereof, and insoluble impurities must be removed, we have found it effective to charge between about 1.5 and about 9 mols of basic metal compound per equivalent of sulfonic acid, and we prefer to charge between about 1.5 and about 4 mols of said base per equivalent of sulfonic acid.

After the reaction mixture of oxygenated vehicle, sulfonic compound, and basic metal compound is formed, the order of addition of these ingredients being immaterial, we pass an acidic gas into the reaction mixture, said acidic gas being selected from the group consisting of $H_2S$, $CO_2$, and $SO_2$.

Of the acidic gases useful in our process we regard $SO_2$ as substantially less desirable to the other two because the resulting $SO_2$-blown product, when incorporated into lubricating oils, gives a composition having inferior low temperature piston ring wear properties as compared to, for example, the $CO_2$-blown product.

Preferably, in the stage of our process when the oxygenated vehicle is maintained in liquid phase the amount of acidic gas passed into the reaction mixture is about 3 to 4 mols per mol of basic metal compound charged, but as low as 1 mol of the acidic gas per equivalent of basic metal compound charged can be used with good effect. Mechanical agitation is useful here. This minimum quantity of acidic gas needed in the intial stage of our process is substantially equal to the stoichiometric amount called for in the conversion of the basic metal compound into the corresponding bicarbonate, bisulfite, or hydrosulfide.

During this stage use of additional acidic gas has no appreciable effect and is wasteful in large scale operation; however, in the removal of oxygenated vehicle, volatile diluents, and/or incidental water such as water of reaction or hydration from the reaction mixture (i.e., the stripping operation) a larger proportion of the acidic gas (and supplemental inert gas and/or use of subatmospheric pressure) assists in stripping off these materials from the reaction mixture. Because the cost of the acidic gas, is in many instances, such as in pilot scale operations, not high, the initial acidic gas feed to the reaction mixture can be quite heavy to obtain intensive mixing at comparatively small expense.

The step of injecting and dispersing the acidic gas into the reaction mixture can be done in as short a time as few minutes, e.g., 2–30 minutes as, for example, while starting to heat a batch from ambient temperature to subsequent final stripping temperature. On the other hand, the operation can be prolonged for an hour or even more, especially if the batch is heavily loaded with solids or has low mobility because of reduced temperature. In effect, substantial saturation of the mixture with the acidic gas appears to be obtained.

We have found, however, that an important control to observe in the step of initial acidic gas dispersal into the reaction mixture for avoiding erratic results and for obtaining reproducible operations is the maintaining of temperature of the reaction mixture during this step below the atmospheric boiling point of the oxygenated vehicle and generally below about 190° F. While not intending to be bound by any theory in this regard we think that the combination of physical and chemical changes, e.g., chemical reaction and stripping effects, etc., exerted on the mixture by the acidic gas and the presence of the solid, liquid and gas phases which are interacting make the operation sensitive. Use of temperature substantially below about 60° F. here is generally impractical because of resulting "stiffness" and high viscosity of the reaction mixture. Temperatures in the range of 100–140° F are preferred in this step although even higher temperatures, e.g., 160–180° F. can be used satisfactorily with the higher boiling vehicles such as the lower alkoxy ethanols.

Atmospheric pressure is preferably used for efficiency and economy, but use of subatmospheric pressures is possible when the temperature prevailing is below the boiling point of the oxygenated vehicle at such reduced pressure. Use of pressure above atmospheric represents unnecessary expense.

If only a single acidic gas is to be used, $CO_2$ is preferred since the CO₂-blown product has very little corrosive effect on materials when compounded with lubricating oils. We prefer, however, to use a dual gas treatment for obtaining the highest metal ratios coupled with a most passive and stable product.

Said dual gas treatment is first to pass hydrogen sulfide into the reaction mixture while the vehicle is maintained in liquid phase, and subsequently, to blow with carbon dioxide (which displaces the hydrogen sulfide) during the subsequent removing of the vehicles and any incidental water (e.g., water of neutralization, water introduced with charge stocks, water of hydration etc.) from the reaction mixture. There results, even with calcium and magnesium which are normally very refractory in this regard, oil-soluble hyperbasic sulfonates having metal ratios between 3 and 9, even when no promoters are present and the organic anionic radicals in the product are those of oil-soluble sulfonic acids only.

Ordinarily in the stripping step of the process temperatures substantially above 450° F. are avoided to prevent degradation of heat-sensitive components in the reaction mixture. Preferably, for efficiency and economy, the stripping operation is conducted by raising temperature of the low-temperature acidic gas-saturated reaction mixture to a temperature of about 200–350° F. while the mixture is being blown with $CO_2$ and/or mixtures comprising $CO_2$ and nitrogen, e.g., flue gases, or even COS (which, under reaction conditions with moisture furnishes $CO_2$ and $H_2S$). Subatmospheric pressure can be used effectively in stripping the vehicle, incidental water, and/or volatile diluents.

The reaction mixture is best finished by maintaining it at elevated temperature, e.g., 200–350° F., for ½–3 or more hours, then preferably filtered while still hot, the preferred filter medium being a closely-woven cloth coated with a conventional filter-aid such as diatomaceous silica (which can be mixed in with the material to be filtered). Viscosity can be lowered, if desired, by addition of suitable mineral oil thinners, e.g., mixed hexanes, benzene, xylenes and kerosene. Filtration at elevated temperatures usually proceeds easily, producing a bright solution of hyperbasic sulfonate.

The following examples show various ways in which our invention has been practiced but should not be construed as limiting the invention. Unless otherwise expressed all parts shown are parts by weight, all percentages are weight percentages, all temperatures shown are in degrees Fahrenheit.

The pressure used in each of the foregoing preparations was atmospheric pressure. The term "pale oil" used in the examples refers to a refined, paraffinic base, hydrocarbon oil diluent having viscosity between 96 and 104 S.S.U. at 100° F. The sulfonic acids and normal sulfonates used in each instance were oil soluble hydrocarbon sulfonic acids and normal sulfonates, their sulfonic acid radicals having mol weight of at least about 350.

Where the term "ambient temperature" is used in the examples what is meant is the temperature resulting from forming the reaction mixture under the ordinary room conditions prevailing without the addition of heat. Naturally, where neutralization reactions ensued, such as occurred when mixing $Ca(OH)_2$ with sulfonic acid, such temperature ordinarily reached 115–130° F. In all instances it was well below 190° F. and in no instance did it attain the atmospheric boiling point of the oxygenated vehicle employed. In each exemplary operation the gas stripping at elevated temperature was effective for removing virtually all the oxygenated vehicle used.

EXAMPLE 1

A mixture of 256 parts of mixed hydrocarbon sulfonic acids (0.4 equivalent), 100 parts of pale oil, 118 parts of calcium hydroxide, and 350 parts of water was blown with carbon dioxide at a rapid rate while warming the mixture gradually from ambient temperature to 300° F. After heating and carbon dioxide blowing at 300° F. for two hours to complete the removal of water the reaction mixture was filtered hot. The product contained 8.5% calcium and had a metal ratio of 4.2.

EXAMPLE 2

A mixture of 1680 parts of mixed hydrocarbon sulfonic acids (3 equivalents), 840 parts of pale oil, 333 parts of calcium hydroxide, and 1200 parts of water was blown with hydrogen sulfide at ambient temperature for an hour and one-half. Then the temperature was raised to 300° F. while still blowing the batch with hydrogen sulfide. The blowing was maintained at that temperature for 3 hours. Finally the mixture was nitrogen-blown for 2 hours at 300° F., then filtered hot. The product contained 3.2% calcium equivalent to a metal ratio of 1.4.

EXAMPLE 3

A mixture of 1120 parts of mixed hydrocarbon sulfonic acids (2 equivalents), 560 parts of pale oil, 222 parts of calcium hydroxide, and 180 parts of methanol was blown with hydrogen sulfide at the rate of 136 parts per hour for 2 hours at ambient temperature, then heated to 300° F. with the hydrogen sulfide blowing continued. After 2 hours of hydrogen sulfide blowing at this temperature the mixture was blown with nitrogen for one hour at the same temperature. The mixture was then cooled to 176° F. and blown with carbon dioxide at a very rapid rate, 3 to 5 parts of water being added each time the top of the reaction vessel became free of condensed water. This operation continued until the off gas from the reaction vessl tested negative for $H_2S$, indicating that all replaceable hydrogen sulfide had been removed by the carbon dioxide. The mixture was then heated with carbon dioxide blowing to 300° F. It was filtered hot to give a product having 5.7% calcium and having a metal ratio of 2.5.

EXAMPLE 4

A mixture of 1120 parts of mixed hydrocarbon sulfonic acids (2 equivalents), 800 parts of pale oil, 592 parts of calcium hydroxide, and 1500 parts of water was blown with carbon dioxide at approximately 376 parts per hour while heating gradually from ambient temperature to 356° F. The blowing was continued at 356° F. and the mixture filtered hot. The filtrate was then stirred with Attapulgus clay (1 part per 10 parts per filtrate) at 300° F. for ½ hour. A second filtration gave a product containing 8.7% calcium and having metal ratio of 4.3.

EXAMPLE 5

A mixture of 200 parts of mixed hydrocarbon carbon sulfonic acid (0.3 equivalent), 100 parts of pale oil, 214 parts of $Ba(OH)_2$, and 275 parts of water was blown with carbon dioxide at 79 parts per hour while warming the batch gradually from ambient temperature to 300° F. After 1½ hours' blowing at 300° F., the mixture was filtered hot. The product contained 10.4% barium and had a metal ratio of 1.6.

EXAMPLE 6

A mixture of 236 parts of mixed hydrocarbon sulfonic acids (0.4 equivalent), 148 parts of pale oil, 357 parts of litharge, and 350 parts of water was blown with carbon dioxide at 79 parts per hour while heating the batch gradually from ambient temperature to 356° F. After 2 hours of blowing at 356° F. the reaction mixture was filtered. The product contained 18.8% lead and had a metal ratio of 1.9.

EXAMPLE 7

A mixture of 1680 parts of mixed hydrocarbon sulfonic acids (3 equivalents), 840 parts of pale oil, 180 parts of magnesium oxide, and 1200 parts of water were blown with hydrogen sulfide at the rate of about 200 parts per hour for 1½ hours, the temperature being ambient temperature. Then the temperature was raised to 300° F. while blowing hydrogen sulfide, and the H₂S blowing was continued at that temperature for 3 hours. The mixture was then blown with nitrogen for 2 hours at 300° F. to remove excess hydrogen sulfide. The product was filtered hot and had a sulfated ash content of 10.3 corresponding to 2.1% magnesium; the metal ratio of the product was 1.3.

EXAMPLE 8

A mixture of 280 parts of mixed hydrocarbon sulfonic acids (0.5 equivalent), 140 parts of pale oil, 63 parts of LiOH·H₂O, and 250 parts of water were blown with hydrogen sulfide at the rate of 32 parts per hour for 1½ hours using ambient temperature. The temperature was then raised to 300° F. with continued hydrogen sulfide blowing. After one hour of hydrogen sulfide blowing at 300° F. the mixture was blown with nitrogen for an hour at the same temperature to remove excess H₂S. The product was filtered hot. It contained 0.83% lithium and had a metal ratio of 2.

EXAMPLE 9

A mixture of 230 parts of mixed hydrocarbon sulfonic acids (0.3 equivalent), 115 parts of pale oil, 84 parts of calcium oxide, and 316 parts of methanol was blown with hydrogen sulfide at the rate of about 92 parts per hour for 2 hours using ambient temperature. Then the hydrogen sulfide was replaced by a stream of gaseous carbon dioxide at the same flow rate, and the reaction mixture was heated up to 300° F. After one hour's blowing at 300° F. the reaction mixture was filtered hot. The production had a sulfated ash content of 41.1% corresponding to 12.1% calcium, and the metal ratio of the product was 7.1.

EXAMPLE 10

A mixture of 222 parts of alkyl aryl sulfonic acid (0.3 equivalent), 222 parts of pale oil, 111 parts of calcium hydroxide, and 790 parts of methanol was blown with hydrogen sulfide at about 92 parts per hour for 1½ hours using ambient temperature, then the hydrogen sulfide was replaced by carbon dioxide flowing at a rate of about 30 parts per hour and the temperature was raised to 300° F. thus removing the solvent. After an hour's blowing at 300° F. the reaction mixture was filtered hot. The product had a sulfated ash content of 32% which corresponds to 9.4% calcium. The metal ratio of the product was 7.1.

EXAMPLE 11

To a mixture of 288 parts of sodium petroleum sulfonate (0.4 equivalent), and 183 parts of pale oil diluent therefor was added a solution of 26 parts of anhydrous calcium chloride dissolved in 158 parts of methanol. This effected a double decomposition reaction whereby calcium petroleum sulfonate and sodium chloride was formed. Then 130 parts of calcium hydroxide was added and the mixture was blown with hydrogen sulfide at about 26 parts per hour for 2 hours at 115–130° F. The reaction mixture was then further blown with carbon dioxide at the same rate replacing the hydrogen sulfide, and the temperature was raised to 300° F. After an hour's blowing at 300° F. the reaction mixture was filtered hot. Filtration removed by-product sodium chloride. The product contained 4.1% calcium and had a metal ratio of 2.4.

EXAMPLE 12

To a mixture of 1700 parts of pale oil, 49 parts of calcium hydroxide, and 500 parts of water was added a solution of 685 parts of mixed hydrocarbon sulfonic acids (1.2 equivalents) dissolved in 995 parts of mixed heptanes. This mixture was heated up to 300° F., sweeping the flask with nitrogen to aid in removing heptanes and water. After 2 hours at 300° F. the mixture was cooled to 150° F., said mixture being essentially normal calcium sulfonate in a hydrocarbon oil vehicle. To the cooled mixture was added 2850 parts of methanol with 400 parts of calcium hydroxide. The resulting mixture was blown with hydrogen sulfide at 346 parts per hour for 2 hours using a temperature of 120–125° F. Then the hydrogen sulfide was replaced by carbon dioxide flowing at the rate of 119 parts per hour, and the temperature was raised to 300° F. for stripping. After 2 hours CO₂ stripping at 300° F. the reaction mixture was filtered hot. The product had a sulfated ash content of 27.7% corresponding to 7% calcium. The product had a metal ratio of 7.

EXAMPLE 13

A mixture of 1188 parts of mixed hydrocarbon sulfonic acids (2 equivalents), 594 parts of pale oil, 121 parts of magnesium oxide, and 790 parts of methanol was blown with hydrogen sulfide at the rate of 136 parts per hour for 2 hours using ambient temperature. The hydrogen sulfide was then replaced by carbon dioxide flowing at the same rate and the temperature was raised to 300° F. After one hour's CO₂ blowing at 300° F. the reaction mixture was filtered hot. The product had a sulfated ash content of 7% corresponding to 2.7% magnesium and a metal ratio of 1.5.

EXAMPLE 14

A mixture of 300 parts of alkyl aryl sulfonic acid (0.4 equivalent), 166 parts of pale oil solvent therefor, 45 parts of calcium hydroxide, and 200 parts of water were blown with hydrogen sulfide at the rate of 27 parts per hour for 2 hours using temperature of 115–130° F. Then the hydrogen sulfide was replaced by carbon dioxide flowing at the same rate and the temperature was raised to 300° F. After blowing for 2 hours at 300° F. the reaction mixture was filtered hot. The product had 2.43% calcium and a metal ratio of 1.4.

EXAMPLE 15

A mixture of 300 parts of alkyl aryl sulfonic acid (0.4 equivalent), 150 parts of pale oil, 45 parts of calcium hydroxide and 158 parts of methanol were blown with hydrogen sulfide at the rate of 28 parts per hour for 2 hours using temperature of 115–130° F. Then the hydrogen sulfide was replaced by carbon dioxide flowing at the same rate, and the temperature was raised to 300° F. where stripping was continued for one hour. The reaction mixture was filtered hot to give a product having a sulfated ash content of 16.4% corresponding to 4.8% calcium. The metal ratio of the product was 2.75.

EXAMPLE 16

A mixture of 300 parts of alkyl aryl sulfonic acid (0.4 equivalent), 150 parts of pale oil, 45 parts of calcium hydroxide, and 157 parts of isopropanol was blown with hydrogen sulfide at 27 parts per hour for 2 hours using temperature of 115–130° F. (ambient temperature). Then the hydrogen sulfide was replaced by carbon dioxide flowing at the same rate, and the temperature was raised to 300° F. Blowing was continued for an hour at this temperature and the product was filtered hot. It contained 3.41% calcium and had a metal ratio of 1.95.

EXAMPLE 17

A mixture of 296 parts of alkyl aryl sulfonic acid (0.4 equivalent), 166 parts of pale oil, 45 parts of calcium hydroxide, and 193 parts of 2-methoxy ethanol-1 ("Methylcellosolve") was blown with hydrogen sulfide at the rate of 27 parts per hour for 2 hours using ambient temperature (115–130° F.). The hydrogen sulfide was then replaced with carbon dioxide flowing at the same rate, and the temperature was raised to 300° F. After an hour's blowing at 300° F. the reaction mixture was filtered hot. The product had a sulfated ash content of 16.6% corresponding to the 4.9% calcium. The metal ratio was 2.85.

EXAMPLE 18

A mixture of 296 parts of alkyl aryl sulfonic acid (0.4 equivalent), 166 parts of pale oil, 45 parts of calcium hydroxide, and 196 parts of 2-ethoxy ethanol-1 ("Cellosolve") was blown with hydrogen sulfide at 27 parts per hour for 2 hours using ambient temperature. Then the hydrogen sulfide was replaced by carbon dioxide flowing at the same rate, and the temperature was raised to 356° F. The filtered product had a sulfated ash content of 16.0% corresponding to 4.7 calcium. The metal ratio of the product was 2.75.

EXAMPLE 19

A mixture of 892 parts of mixed hydrocarbon sulfonic acids (1.5 equivalents), 892 parts of pale oil, 300 parts of water, and 48 parts of commercial grade calcium hydroxide were heated to 300° F. while sweeping the atmosphere of the reactor with a stream of nitrogen to aid in water removal. After maintaining this condition for an hour at 300° F. a virtually dry calcium sulfonate resulted. It was cooled. Then 600 parts of methanol and 90 parts of calcium oxide were added, and the resulting mixture was blown with hydrogen sulfide at the rate of 102 parts per hour for 2 hours without heating. Next, the reaction mixture was blown with carbon dioxide at the rate of 132 parts per hour while the temperature was raised to 300° F. The reaction mixture was filtered hot. A composite of 4 batches prepared in this way had a sulfated ash content of 13.05% corresponding to 3.85% calcium. The metal ratio of the composite was 2.33.

This product was blended with a base lubricating oil of 20–20W S.A.E. grade. The resulting experimental blend contained 0.204% calcium corresponding to 0.7% barium by ratio of the molecular weights of these respective alkaline earth metals.

The experimental blend was tested in the Buick Valve Train Wear Test, as was a comparative lubricating oil composition of the same S.A.E. grade containing a conventional barium sulfonate detergent and having 0.7% barium concentration. This test utilized a standard 1955 Buick series 60–70 engine with 1955 camshaft and valve lifters. A camshaft and lifters are installed prior to each run. No modification was made to the engine. Test conditions were as follows:

Load, brake horsepower_____ 11.
Speed, r.p.m._____ 1000.
Water out, ° F_____ 180±5.
Oil temperature, ° F_____ 190±5.
Duration, hours_____ 60.
Normal crankcase ventilation_____ No vacuum.

A rating from visual examination of the valve lifters is made on a scale of 1 to 10; the rating 10 indicates virtually no wear on the lifter face; a rating of 6 indicates the appearance of a groove across the lifter face of sufficient depth to note by touch; such groove is more pronounced at a rating of 3, and is severe at a rating of 1. A rating of 8.7–10 indicates good performance of the lubricant under test; borderline performance is indicated with a rating of 8.6–7.8; and poor performance is indicated with a rating between 1 and 7.7. High-grade lubricating oils presently on the market have a rating of 9 or better in this test.

After 40 hours testing the rating of the experimental blend was 9.6 and the rating of the comparative oil 9.0. At the end of the test (60 hours) the rating of the experimental blend was 9.2 and of the comparative oil 8.8.

EXAMPLE 20

The carbon-dioxide neutralized hyperbasic calcium sulfonates employed in the blend used in the test described hereinafter contained 3.55% calcium and had a metal ratio of 5.63. The method of preparation was generally similar to the one shown in Example 15.

This hyperbasic calcium sulfonate, 3.95%, was blended with a base lubricating oil of S.A.E. 30 grade. The resulting experimental blend had a calcium concentration of 1.14%, corresponding (by ratio of molecular weights) to 0.6% barium. This experimental blend was tested in a Chevrolet L-4 test, as was a comparative lubricating oil composition of same S.A.E. grade containing a conventional barium sulfonate detergent and having 0.6% barium.

The Chevrolet L-4 Test, also known as the CRC–L-4 Oxidation Test (and further known as a modified CRC–L-4–1252 Test), was run on the lubricant at 265° F. crankcase temperature in accordance with conventional procedure. Passing this test requires a copper-lead bearing weight loss below a specified maximum, and a satisfactory CRC rating and piston rating with respect to deposits or engine cleanliness. The acceptable bearing weight loss is 0.300 grams for 2 whole bearings. The piston rating is on a numerical scale from 0 to 10, with 10 representing a perfectly clean piston and lower numbers representing progressively poorer results due to increased varnish and deposits. A piston rating of 8 or above in this test is good. The over-all CRC rating is on a basis of 100 for perfect over-all cleanliness; a value above 85 is quite satisfactory.

The test results were as follows:

|  | Experimental Blend | Comparative Oil |
|---|---|---|
| Piston | 9.0 | 9.5 |
| Total | 94.0 | 95.4 |
| Bearing weight loss, grams per 2 whole bearings | 0.111 | 0.140 |

EXAMPLE 21

Another experimental blend was made with the hyperbasic calcium sulfonate used in the previous example and a base lubricating oil of 20–20W S.A.E. grade. There was used .95% of the hyperbasic sulfonate to give 0.14% calcium corresponding to 0.6% barium (by ratio of their molecular weights). This experimental blend was tested in a Modified CRC–FL–2–650 Test, also known as a Chevrolet SII Test, as was a comparative lubricating oil composition of the same S.A.E. grade containing a conventional barium sulfonate detergent and having 0.6% barium.

For this modified procedure the laboratory engines were operated under the standard conditions of the CRC–FL–2–650 Test with the exception that crankcase oil temperatures were 10° F. lower, the water jacket temperatures were 5° F. lower, and the crankcases of the test engines were ventilated. These modifications are in every case in the direction of making the test more severe and are intended to simulate low temperature conditions wherein deposit formation is most pronounced. After the termination of each run, the engine is disassembled and its parts are evaluated by a merit system adapted from the CRC–L–4–1252 Test. This merit system involves visual examination of the engine part in question and its rating according to deposits by comparison with standards which have assigned ratings. For example a rating of 10 on piston skirt designates a perfectly clean piston while a rating of zero represents the worst condition. Similarly, a rating of 100 on total engine deposits represents a perfectly clean engine, etc.

The test results were as follows:

|  | Experimental Blend | Comparative Oil |
|---|---|---|
| Piston | 6.2 | 4.0 |
| Total | 84.2 | 75.0 |

From the foregoing exemplary preparations it can be seen that our process is applicable to a wide variety of hydrocarbon sulfonic acids and corresponding normal metal sulfonates for rendering them hyperbasic with respect to filterable metal content. In addition, as shown particularly in Examples 10, 11, and 12, unpromoted calcium sulfonates have been made with spectacularly high metal ratio, all free and combined acidic organic radicals present in the composition having molecular weight of at least about 350.

Also to be noted particularly in our preparation is that the initial mixture submitted to the gas blowing is not a "complex" or other special form of dispersion, but rather a plain, heterogeneous mixture, resulting from blending the starting materials.

We claim:

1. A process for producing hyperbasic metal sulfonates which comprises forming a promoter-free initial reaction mixture consisting essentially of at least one inert, stable, oxygenated vehicle selected from the group consisting of lower alkanols, water, and lower alkoxy ethanols, at least one sulfonic compound selected from the group consisting of oil-soluble sulfonic acids and normal metal salts thereof, and at least one basic metal compound selected from the group consisting of metal oxides, hydroxides and hydrated oxides in a ratio of from greater than 1 to about 20 equivalents of said basic metal compound per equivalent of said sulfonic compound for establishing a metal ratio in the said reaction mixture in excess of one, injecting into and dispersing through said initial reaction mixture at least about a mol of an acidic gas selected from the group consisting of $H_2S$, $CO_2$, and $SO_2$ and their mixtures per equivalent of basic metal compound at a temperature below the atmospheric boiling point of said oxygenated vehicle and between about 60° and 190° F., and subsequently stripping off said vehicle and incidental water from the acidic gas-treated reaction mixture whereby a hyperbasic metal sulfonate results.

2. The process of claim 1 wherein hydrogen sulfide is the acidic gas initially dispersed into the reaction mixture, and thereafter carbon dioxide is passed through the reaction mixture as the vehicle is being stripped off.

3. The process of claim 1 wherein acidic gas initially dispersed through the reaction mixture is carbon dioxide, and thereafter carbon dioxide is passed through the reaction mixture as the vehicle is being stripped off.

4. The process of claim 1 wherein the vehicle is water.

5. The process of claim 1 wherein the vehicle is lower alkanol.

6. The process of claim 1 wherein the vehicle is lower alkoxy ethanol.

7. The process of claim 1 wherein the hyperbasic sulfonate being made is a calcium sulfonate, and the basic metal compound used is a calcium compound.

8. The process of claim 1 wherein the hyperbasic sulfonate being made is a magnesium sulfonate, and the basic metal compound is a magnesium compound.

9. The process of claim 1 wherein the hyperbasic sulfonate being made is a barium sulfonate, and the basic metal compound used is a barium compound.

10. The process of claim 1 wherein the hyperbasic sulfonate being made is a lithium sulfonate, and the basic metal compound used is a lithium compound.

11. The process of claim 1 wherein the hyperbasic sulfonate being made is a lead sulfonate, and the basic metal compound used is a lead compound.

12. The process of claim 1 wherein about 2–10 parts by weight of vehicle are used per part of the basic metal compound, sulfonic acid is the sulfonic compound used, and between about 1.5 and 9 mols of basic metal compound are used per equivalent of sulfonic acid in said reaction mixture.

13. The process of claim 1 wherein said stripping comprises passing said acidic gas into said mixture while maintaining said mixture within a temperature range of between about 200 and 450° F. for a period sufficient to strip off said oxygenated vehicle and incidental water from the acidic gas-treated reaction mixture and recovering said hyperbasic metal sulfonate.

14. The process of claim 1 wherein said acidic gas is a mixture of carbon monoxide and hydrogen sulfide.

15. A process for producing hyperbasic alkaline earth metal sulfonates which comprises forming a promoter-free initial reaction mixture consisting essentially of at least one inert, stable oxygenated vehicle selected from the group consisting of lower alkanols, water, and lower alkoxy ethanols, at least one sulfonic compound selected from the group consisting of oil-soluble sulfonic acids and normal metal salts thereof, and at least one basic metal compound selected from the group consisting of alkaline earth metal oxides, hydroxides and hydrated oxides in a ratio of from greater than 1 to about 20 equivalents of said basic metal compound per equivalent of said sulfonic compound for establishing a metal ratio in said reaction mixture in excess of 1 and less than about 9, passing into and dispersing through said initial reaction mixture at ambent temperature at least about a mol of an acidic gas selected from the group consisting of $H_2S$, $CO_2$ and $SO_2$ and their mixtures per equivalent of basic metal compounds, heating the mixture from said ambient temperature to an elevated temperature within the range of from about 200° to about 450° F. while passing said acidic gas into the mixture, maintaining the heated mixture within said elevated temperature range for a period sufficient to strip the oxygenated vehicle and incidental water therefrom and recovering a hyperbasic alkaline earth metal sulfonate.

16. An oil soluble hyperbasic metal sulfonate prepared by the method comprising from a promoter-free initial reaction mixture consisting essentially of at least one inert, stable, oxygenated vehicle selected from the group consisting of lower alkanols, water and lower alkoxy ethanols, at least one sulfonic compound selected from the group consisting of oil soluble sulfonic acids and normal metal salts thereof, and a basic metal compound selected from the group consisting of metal oxides, hydroxide and hydrated oxides in a ratio of from greater than 1 to about 20 equivalents of said basic metal compound per equivalent of said sulfonic compound for establishing a metal ratio in said reaction mixture in excess of one, injecting into and dispersing through said initial reaction mixture at least about a mol of an acidic gas selected from the group consisting of $H_2S$, $CO_2$ and $SO_2$ and their mixtures per equivalent of basic metal compound at a temperature below the atmospheric boiling point of said oxygenated vehicle and between about 60 and 190° F., and subsequently stripping said vehicle and incidental water from the acidic gas-treated reaction mixture whereby a hyperbasic metal sulfonate results.

17. An oil soluble hyperbasic alkaline earth metal sulfonate prepared by the method comprising forming a promoter-free initial reaction mixture consisting essentially of at least one inert, stable oxygenated vehicle selected from the group consisting of lower alkanols, water and lower alkoxy ethanols, at least one sulfonic compound selected from the group consisting of oil-soluble sulfonic acids and normal metal salts thereof, and at least one basic metal compound selected from the group consisting of alkaline earth metal oxides, hydroxides and hydrated oxides in a ratio of from greater than 1 to about 20 equivalents of said basic metal compound per equivalent of said sulfonic compound for establishing a metal ratio in said reaction mixture in excess of 1 and less than about 9, passing into and dispersing through said initial reaction mixture at ambient temperature at least about a mol of acidic gas selected from the group consisting of $H_2S$, $CO_2$ and $SO_2$ and their mixtures per equivalent of basic metal compound, heating the mixture from said ambient temperature to an elevated temperature within the range from about 200 to about 450° F. while passing said acidic gas into the mixture, maintaining the heated mixture within said elevated temperature range for a period sufficient to strip the oxygenated vehicle and incidental water therefrom and recovering a hyperbasic alkaline earth metal sulfonate.

18. A product in accordance with claim 17 wherein said sulfonic compound is an oil soluble sulfonic acid having a mol weight of at least about 350 and wherein said metal is calcium.

19. A product in accordance with claim 16 wherein said acidic gas is a mixture of carbon dioxide and hydrogen sulfide.

References Cited in the file of this patent

UNITED STATES PATENTS

| | | |
|---|---|---|
| 2,501,732 | Mertes | Mar. 28, 1950 |
| 2,616,904 | Asseff et al. | Nov. 4, 1952 |
| 2,617,049 | Asseff et al. | Nov. 4, 1952 |
| 2,695,910 | Asseff et al. | Nov. 30, 1954 |

FOREIGN PATENTS

| | | |
|---|---|---|
| 570,814 | Canada | Feb. 17, 1959 |
| 574,161 | Canada | Apr. 14, 1959 |

Notice of Adverse Decision in Interference

In Interference No. 94,376 involving Patent No. 3,057,896, R. C. Schlicht and H. D. Kluge, Hyperbasic sulfonates, final judgment adverse to the patentees was rendered Feb. 12, 1968, as to claim 5.

[*Official Gazette March 11, 1969.*]

Disclaimer 3,057,896.—*Raymond C. Schlicht*, Hopewell Junction, and *Herman D. Kluge*, Fishkill, N.Y. HYPERBASIC SULFONATES. Patent dated Oct. 9, 1962. Disclaimer filed Apr. 2, 1969, by the assignee, *Texaco Inc.*

Hereby enters this disclaimer to claim 5 of said patent.

[*Official Gazette September 23, 1969.*]